Patented May 6, 1952

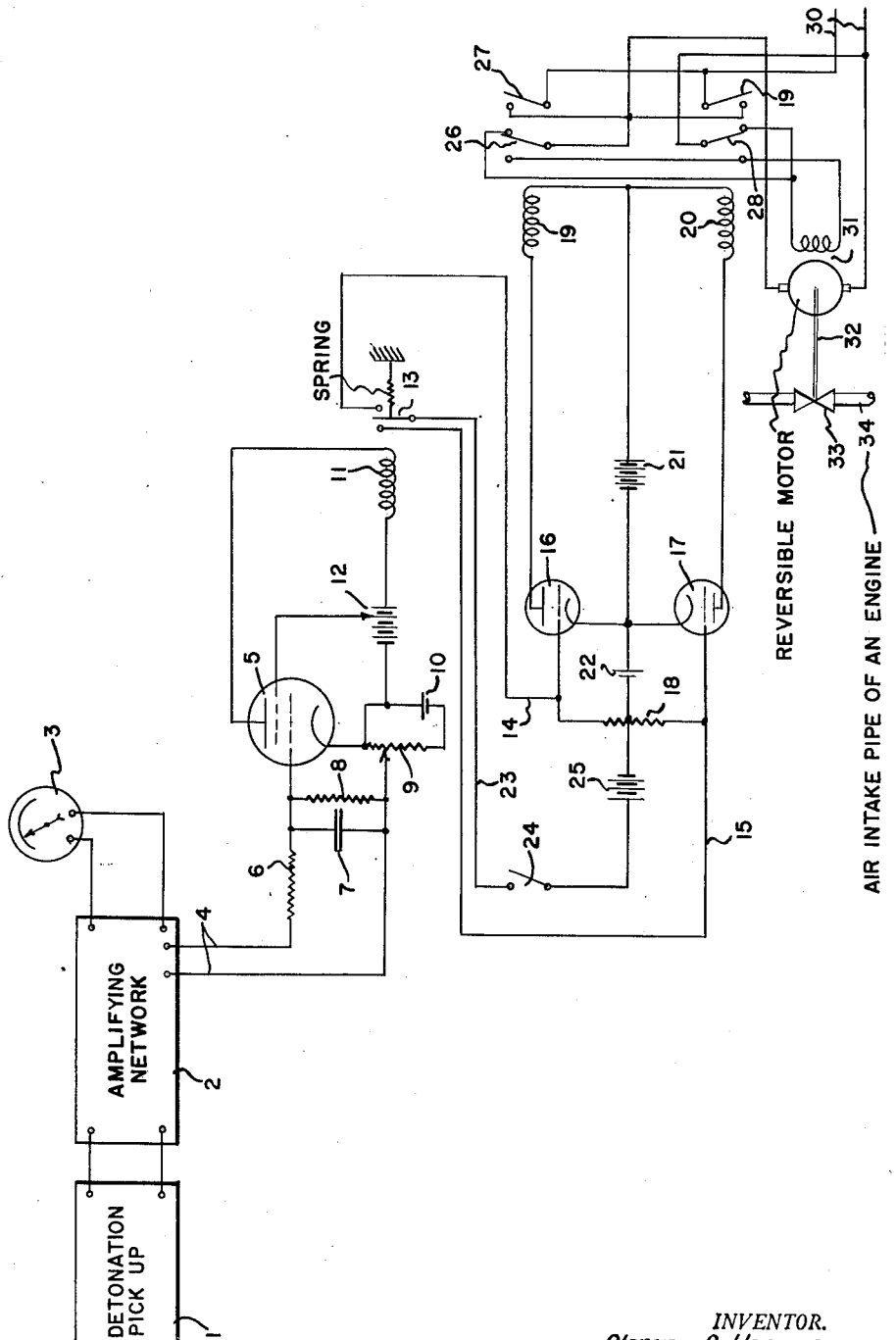

2,595,524

UNITED STATES PATENT OFFICE 2,595,524

APPARATUS FOR CONTROLLING INTERNAL-COMBUSTION ENGINES

Clarence O. Henneman and Deslonde R. deBoisblanc, Bartlesville, Okla., assignors to Phillips Petroleum Company, a corporation of Delaware Application July 19, 1945, Serial No. 606,005

2 Claims. (Cl. 123—119)

This invention relates to an improved apparatus for controlling internal combustion engines with special relation to the automatic adjustment of one of the operating variables thereof upon incremental change of another variable under conditions of constant knock intensity.

A more specific object of the invention is to provide a means for automatically controlling the air supply to an engine, and particularly a fuel test engine with incremental changes in the fuel supplied thereto to cause the engine to operate under varying conditions at constant knock intensity.

Another object of the invention is to automatically adjust the air consumption of an internal air combustion engine in such a manner that the engine will operate at a standard or predetermined constant knock intensity under varying fuel supply conditions.

A still further object of this invention is to provide an automatic air flow control for an internal combustion engine with changes in the fuel supply thereto to cause the operation of the engine under a predetermined knocking condition which includes maintenance of engine operating conditions at nondestructive knock intensity.

Other and more detailed objects of the invention will be apparent from the following description of one embodiment thereof when taken in connection with the attached drawings.

This invention resides substantially in the combination, construction, arrangement and relative location of parts, steps and series of steps, all as will be described in detail below.

In the accompanying drawing the single figure is a diagrammatic and schematic illustration of a system in accordance with this invention.

The power obtainable from a given fuel in the operation of an internal combustion engine is limited by the knocking characteristics of the particular fuel and engine, and any engine obtaining maximum power from a particular fuel will be in a knocking condition. However, for all practical purposes the knock of an engine may be maintained at a nondestructive intensity. In accordance with this invention an operation and method is disclosed by means of which under varying operating conditions the knock intensity of an internal combustion engine may be maintained under predetermined test conditions or under conditions of nondestructive intensity. Thus it is within the scope of this invention and the utilization thereof to apply it for the purpose of facilitating and expediting the routine operation of test engines as well as the application thereof to engines in ordinary normal use.

In the application of the invention for engine testing the apparatus will be adjusted to cause a predetermined knocking intensity for a particular fuel at some setting of the fuel supply and to maintain this knock intensity through the automatic adjustment of the air supply thereto as incremental changes are made in the fuel supply to the engine. On the other hand, in the application of the invention to the normal use of an engine the apparatus may be adjusted to cause the engine to operate at a nondestructive knock intensity under maximum power output conditions, and thereafter automatically adjust the air supply to the engine as incremental changes are made in the fuel supply incident to the normal operation of the engine.

These functions are accomplished by employing a voltage proportional to the time average of the peak detonation pressure generated by and in accordance with variations in that pressure for controlling an electro-mechanical system including a motor for operating the air supply valve in the intake manifold of the engine.

In the system illustrated in the drawings the pickup device 1 for converting pressure variations in the cylinders of the engine into electrical currents proportional thereto is connected to the input of an amplifying network 2. This amplifying network is preferably of the vacuum tube type containing the necessary circuits and designed to produce at its output a voltage which will operate the knock intensity indicating meter 3. The elements 1, 2 and 3 diagrammatically illustrate an average or peak reading detonation meter for visibly indicating the intensity of the pressure variation in the engine cylinders, and hence the knock intensity when properly calibrated by the use of a current generated by and in proportion to variations in such pressure. Apparatus of this type is well known in the electronic arts in several different forms.

A portion of the output of the amplifying network 2 is applied through the leads 4 to a tetrode 5, one of the leads being connected to the control grid thereof through the resistor 6 and the other lead to the cathode thereof through an adjustable resistor 9. A by-pass condenser 7 is shunted across the grid and cathode in parallel with a resistor 8, as shown. The resistor 9 is shunted by a biasing battery 10 and the lead 4 connected thereto has an adjustable connection to the resistor for a purpose to be described. The anode of the tetrode is connected to the cathode through a magnet winding 11 and a potential source 12. The screen grid of the tetrode has an adjustable connection to the battery 12, as shown. The electro-magnet 11 controls a single pole two-position switch having the movable blade 13 and a pair of fixed co-operating contacts. The movable blade 13 is preferably of resilient material and is biased to a neutral position by means of a spring as shown, anchored on any suitable adjacent fixed support. One of the fixed contacts of this switch is connected by lead 14 to the control grid of triode 16, while the other lead 15 is connected to the control grid of a triode 17. Interconnecting these grids is a resistor 18 between the midpoint of which and the connected cathodes of the triodes is a biasing battery 22. The anodes of the tetrodes 16 and 17 are connected in parallel through the electro-magnets 19 and 20 back to the cathode through an operating potential source 21. The midpoint of resistor 18 is connected to switch blade 13 by wire 23 through a switch 24 and a potential source 25. Electro-magnet 19 operates the single-pole double-throw switch 26 and the single-pole single-throw switch 27. Similarly the electro-magnet 20 operates the single-pole double-throw switch 28 and the single-pole switch 29. A reversible shunt motor 31 has its armature connected at one side to one of the power leads 30 and connectible at the other side to the other power lead 30 through either of the single-pole switches 27 and 29 depending upon which is closed. The back contacts of the switches 26 and 28 are connected together as shown and to one terminal of the shunt winding of the motor 31. The front contacts are connected to the other terminal of the winding as shown. The common connection between the fixed contacts of switches 27 and 29 are connected to the movable blade of switch 26 while the movable blade of switch 28 is connected to the power lead 30 as shown. The armature in the motor is connected as indicated at 32 to a valve 33 in the air intake pipe 34 of an internal combustion engine.

This apparatus is operated as follows in order to accomplish the objects of this invention. The engine is set in operation and with switch 24 open the engine is adjusted so as to produce a desired knock intensity, as indicated by the meter 3. The movable contact in resistor 9 is then adjusted to a position where the switch blade 13 is in central or neutral position, out of engagement with either of the associated fixed contacts. Switch 24 may then be closed and the device is ready to be operated either for testing purposes or for normal use of the engine. Of course, for testing purposes the knock intensity will preferably be adjusted to a higher value than for ordinary use of the engine.

When the fuel supply to the engine is changed in a direction say to increase the voltage at the output of the network 2, the current flowing to the magnet 11 will be reduced and the spring will close switch 13 on its front contact. This will establish a circuit from the switch blade through wire 23, closed switch 24, battery 25, the upper half of resistor 18 and back to switch 13. This will remove the voltage block on the grid of triode 16, permitting current to flow through the magnet 19, closing switch 27 and shifting switch 26 to its back contact. Current then flows from one lead 30 through the armature of motor 31 through switch 27 and back to the other lead 30. Current will also flow from the lower lead 30 through front contact of switch 28 through the shunt winding of motor 31, through the back contact of switch 26 to the lead connected to switch 27, and thence to the other lead 30. Thus the motor 31 will operate the valve 33 in a direction to decrease the air flow to the engine, thus causing an increase in the fuel-air ratio which in turn decreases the detonation in the cylinder and thereby decreases the potential across conductors 4. The adjustment of the air will continue until the engine again operates at a point where the potential is brought back to the predetermined values which give the originally selected knock intensity. Thus sufficient current will finally flow through the magnet 11 to bring switch blade 13 back to neutral position.

On the other hand, should the final adjustment have been made so as to decrease the signal voltage input to the tetrode 5 the current flowing through the magnet 11 will increase, closing switch blade 13 on its back contact, thereby removing the voltage block on the grid of triode 17, so that the current to magnet 20 will increase and switch 29 will close and switch 28 will move to its back contact. At this time, of course, switches 26 and 27 are back in the position illustrated in the drawings. Under these conditions the motor 31 will be operated in the reverse direction, operating valve 33 in turn to increase the air flow to the engine, thereby decreasing the fuel-air ratio which in turn increases detonation in the cylinder, thereby increasing the potential across the input of tetrode 5. The result is that the current in magnet 11 will gradually decrease until the spring opens switch 13, at which time motor 31 will stop and the engine will be back to the preselected knock intensity.

As those skilled in the electrical circuit art will appreciate the constants of the network 2 can be so designed and adjusted as to regulate the response of the system so that the equilibrium point will be approached so gradually as to prevent overshooting and thereby eliminating hunting of the apparatus. The values of resistors 6 and 9 will be selected and adjusted in relation to the amplification characteristics of the network 2 to give the desired performance in accordance with the objects of this invention, as will be fully appreciated by those skilled in the art.

It will be seen that although the system is disclosed as controlling the air supply to the engine that the system may be altered to control any of the engine variables such as air flow, fuel flow, spark advance, and the like for incremental changes in some other variable to bring on or decrease detonation and maintain it at a given intensity. Thus if one engine variable is changed manually the device will automatically adjust the control on which it is installed to bring the engine back to the desired detonation intensity.

It follows, therefore, that in the testing of fuels the operations involved may be simplified to the end that the work may be done more quickly. In accordance with present practice the fuel and air supply to the engine to bring the knock intensity to a standard level must be made manually, requiring the operator to make two related adjustments while reading the meter. By the use of this invention fuel testing will involve making incremental changes in the fluid flow only, for example, since the related variable will be automatically adjusted. This will greatly simplify the operator's work and make it possible for him to conduct more tests per unit of time.

Those skilled in the art will appreciate the subject matter of this invention as capable of considerable variation, and we do not, therefore desire to be strictly limited to the disclosure as given herein, but rather by the claims granted us.

What is claimed is:

1. Control apparatus for an internal combustion engine comprising, in combination, a detonation meter for producing a voltage representative of the average knock intensity in a cylinder of an internal combustion engine, a control lever for regulating an operating variable of said engine whereby movement of said lever in one direction causes the engine knock intensity to increase and movement of said lever in another direction causes the knock intensity to decrease, and means controlled by the amplitude of said voltage to move the lever in said one direction when the amplitude falls below a first predetermined value and to move the lever in said other direction when the amplitude rises above a second predetermined value.

2. Control apparatus for an internal combustion engine comprising, in combination, a detonation meter for producing a voltage representative of the average knock intensity in a cylinder of an internal combustion engine, a control lever for regulating the fuel-air ratio of said engine, a reversible electric motor for rotating said lever in one direction to increase the fuel-air ratio and for rotating said lever in the opposite direction to decrease the fuel-air ratio, a current source for operating said motor, a two-position relay connected in circuit with said current source and said motor to rotate it in one direction when one set of relay contacts is closed and to rotate it in the opposite direction when a second set of relay contacts is closed, and means controlled by the amplitude of the output voltage of said detonation meter for energizing said relay to close one set of contacts when the amplitude of said output voltage falls below a first predetermined value and to energize said relay to close said second set of contacts when the amplitude of said output voltage rises above a second predetermined value.

CLARENCE O. HENNEMAN.
DESLONDE RAYMOND DE BOISBLANC.

REFERENCES CITED

The following references are of record in the file of this patent:

UNITED STATES PATENTS

| Number | Name | Date |
|---|---|---|
| 2,220,558 | Van Dijck et al. | Nov. 5, 1940 |
| 2,275,675 | Draper et al. | Mar. 10, 1942 |
| 2,401,563 | Hersey | June 4, 1946 |
| 2,407,652 | Costa | Sept. 17, 1946 |
| 2,450,882 | Costa | Oct. 12, 1948 |